April 28, 1970

K. BEERLI 3,508,800

TEXTILE MILL SPINDLE BEARING ASSEMBLY

Filed Aug. 27, 1968

INVENTOR.
Karl Beerli ized Apr. 28, 1970

3,508,800
TEXTILE MILL SPINDLE BEARING ASSEMBLY
Karl Beerli, Niederuster, Zurich, Switzerland, assignor to Spindel-, Motoren- und Maschinenfabrik AG, Uster, Zurich, Switzerland
Filed Aug. 27, 1968, Ser. No. 755,553
Claims priority, application Switzerland, Aug. 29, 1967, 12,078/67
Int. Cl. F16c 35/00
U.S. Cl. 308—152                                           7 Claims

ABSTRACT OF THE DISCLOSURE

A bearing assembly for textile mill spindles comprises a casing in which a bearing sleeve containing a collar bearing and a foot bearing for the spindle shaft is oscillably mounted. The casing is connected to the spindle rail by means of a resilient member permitting oscillation and lateral displacement of the casing. Moreover, the casing is oscillably retained at a second level by a second retaining member fixed to an auxiliary support rigidly connected to the spindle rail. The position of either or both said resilient member and said second retaining member relative to the spindle rail and to the auxiliary support, respectively, is adjustable transversely of the axis of the casing.

---

Figure 1:
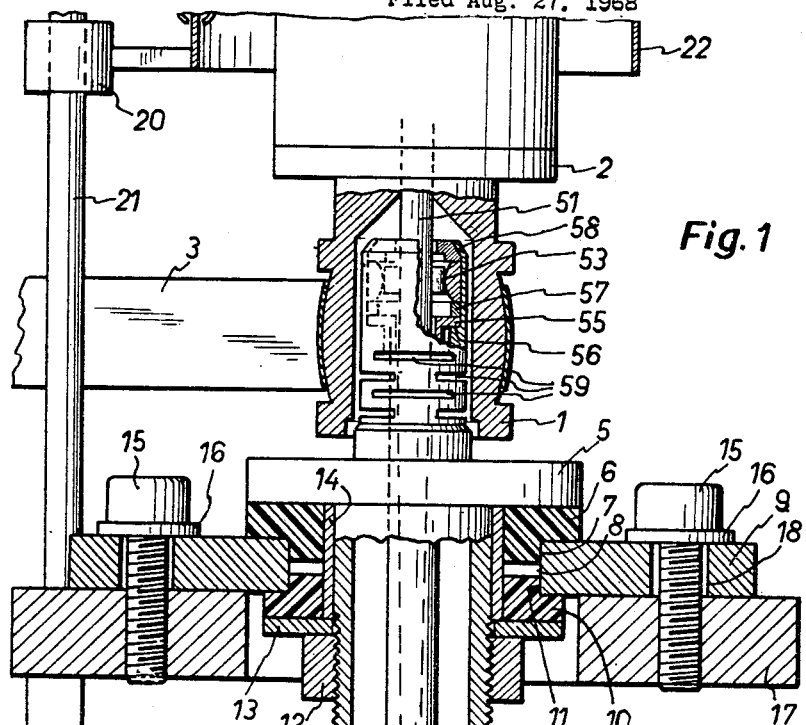

The invention relates to a bearing assembly for a textile mill spindle such as a spinning or twisting spindle, and more particularly to a textile mill spindle bearing assembly of the kind comprising a casing with bearings for supporting a spindle shaft, at least one of said bearings being yieldably connected to said casing in such a manner that the axis of the spindle shaft is enabled to effect pendular movements relative to the axis of said casing and/or gyratory movements along conical surfaces about that axis, said casing being in turn connected to a support or frame member for parallel and/or swinging displacement relative thereto, additional holding means being provided for engaging said casing in a zone remote from its said connection to said support or frame member for exerting on the casing forces which tend to counteract transverse displacement of the casing in said zone.

Examples of a bearing assembly of this kind have been described in my earlier U.S. Patent No. 3,049,860 issued Aug. 21, 1962, and entitled "Bearing Assembly for Textile Machinery Spindles." They have been used hitherto for spindles in spinning or twisting processes without spinning rings and travellers.

According to the specification of my said earlier patent, the bearings which are to receive the spindle shaft can be mounted in a bearing sleeve which is yieldingly connected to the casing (or to its portion connected to the spindle rail or frame), in such a manner that the axis of said bearing sleeve is enabled to effect pendular and/or gyratory movements relative to the axis of the casing.

The said means whereby the casing is engaged in a zone remote from its said connection to said support or frame member for exerting on the casing forces which tend to counteract transverse displacement of the casing may comprise, according to my said earlier patent, a second retaining member for retaining the casing, at a point spaced from its connection with the said yieldable element, on an auxiliary support member which is rigidly connected to the aforesaid support or frame member.

Such bearing assemblies are distinguished by vibration-free running at high speeds of revolution, since the centroidal axis of the spindle and of the masses rotating therewith on rotation of the spindle, assumes a fixed position and remains steady while both the geometrical axis of the spindle shaft and of the bearing sleeve and that of the bearing casing can effect the gyratory motion necessary for that purpose.

Hitherto, however, such bearing assemblies could not, in spite of a growing demand for a suitable bearing for high speed operation, be used in spinning or twisting with a ring and traveller because coincidence of the steady axis of rotation of the spindle with the centre axis of the spinning ring could not be ensured.

In the case of ring spinning frames, the casings of the spindle bearing assemblies therefore had to be rigidly bolted onto the spindle rail, in order to prevent harmful variations in yarn tension. However, with such rigidly bolted bearing assemblies the vibrations caused by unbalance in the bobbins and yarn are transmitted to the spindle rail and through this also to adjacent spindles. Therefore, the desired high spindle rotation speed cannot often be obtained in practice.

The present invention has for its object to provide a bearing assembly for spinning or twisting spindles which makes it possible to bring about such a coincidence of the axis of rotation of the spindle, when this is steadied while rotating at high speed, with a predetermined axis, for example the centre axis of a spinning or twisting ring.

This is achieved in accordance wih the invention in that at least one member by means of which the spindle bearing casing is retained in the spindle rail, is connected to the spindle rail so as to be adjustable transversely of the longitudinal axis of the casing.

Thereby, the axis around which the spindle rotor rotates at high speed and which then practically remains steady, can be brought to coincide with a given axis, in particular with the centre axis of a spinning or twisting ring.

In order to ensure silent running, the spindle bearing casing can also be connected with the said structural component by means of a yieldable element.

It is also an advantage, if the spindle bearing casing, at a distance from the point of its connection with the first-mentioned yieldable element, is provided with an additional weight, whose inertia produces forces of inertia acting against the transverse motion of a point on the longitudinal axis of the casing. In this way, an advantageous distribution of the forces of reaction of the first-mentioned flexible element and of the said structural component or of the second flexible element, produced by vibrations from the spindle, can be obtained.

Figure 2:
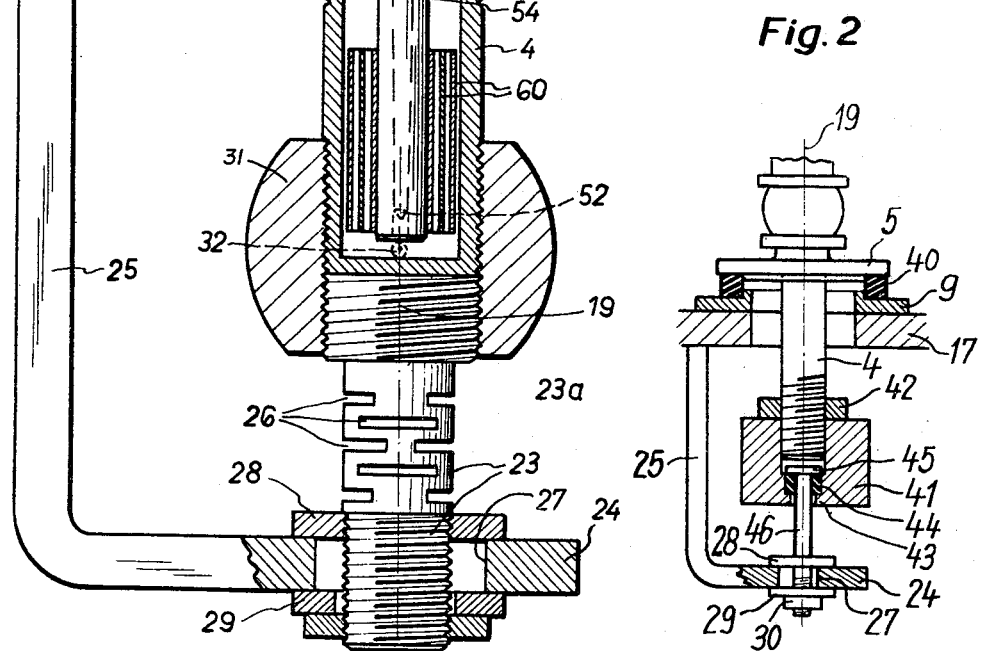

Specific embodiments of the invention will now be described by way of example, with reference to the accompanying drawing, in which:

FIG. 1 is a side view of a ring spinning spindle of the bearing assembly with parts shown in vertical section, and, FIG. 2 is a side view of a ring spinning spindle with another form of embodiment of the bearing assembly.

The rotor of the ring spinning spindle shown in FIG. 1 has a spindle shaft 51 on which a driving pulley 1 and a bobbin 2 covered with spun yarn are mounted; a driving belt 3 runs round the pulley 1.

The spindle shaft 51 is rotatably supported in a spindle bearing casing 4 by means of a foot bearing 52 and a collar bearing 53. The foot bearing 52 is formed by the bottom of a rigid bearing sleeve 54 provided at its upper end with an external flange 55 resting on an annular seat 56 in the casing 4. The collar bearing 53 has an outer race resting, by the intermediary of a spacing ring 57, on the flange 55 of the bearing sleeve 54. These three parts are immovably maintained together in their position in the casing 4 by the marginal portion 58 thereof, which is flanged inwardly onto the outer race of bearing 53.

Below the annular seat 56, the casing 4 has a number of angularly offset incisions or slots 59 disposed in parallel planes which impart flexibility to the casing in that zone, while the portion of the casing 4 which is situated below that flexible zone is substantially rigid.

Thereby, the collar 53 and the bearing sleeve 54 are enabled to oscillate, and the foot bearing 52 to effect lateral displacement, with reference to the rigid portion of the casing 4. The axis passing through the centers of said bearings 52 and 53, and thereby the axis of the spindle shaft 51 are thus enabled to effect pendular and/or gyratory displacements relative to the axis 19 of the substantially rigid lower portion of the casing 4.

In a modification not shown in the drawings, the casing 4 could be substantially rigid throughout and the collar bearing 53 thus could be immovably fixed in the casing; this bearing would then be so configurated that it nevertheless would permit pendular and gyratory displacement of the spindle shaft 51, while the bearing sleeve 54 would be flexible between its flange 55 and the foot bearing 52 to permit lateral displacements of the latter within the casing 4.

In known manner, the interval between the bearing sleeve 54 and the wall of the casing 4 is filled with lubricating oil, and a member of coaxial tubular baffles 60 may be loosely placed in that interval to improve the damping of lateral movements of the lower part of the bearing sleeve 54.

The spindle bearing casing 4 has an outer flange 5 by means of which it rests on a rubber plate 6, which fits with a centering collar 7 into a circular aperture 8 of a supporting plate 9. A second rubber plate 10 with a centering collar 11, which likewise fits into the aperture 8 of the supporting plate 9, is compressed from below by a nut 12, bearing against a washer 13 and screwed onto the spindle bearing casing 4. A spacer sleeve 14, which encloses the casing 4 between the washer 13 and the flange 5, determines the degree of compression which may be applied to rubber plates 6 and 10 through the nut 12.

The spindle bearing casing 4 is therefore held by means of the rubber plates 6 and 10 so as to be transversely movable and swingable in the supporting plate 9. The latter is in turn fastened by means of screws 15 and washers 16 to the spindle rail 17 of the ring spinning frame; the diameter of bores 18 in the supporting plate 9, through which the screws 15 pass, is substantially greater than the diameter of the screws themselves, so that the supporting plate 9 and with it the spindle bearing casing 4 is adjustable transversely with respect to the axis 19 of the latter.

The ring rail 20 of the ring spinning frame is moved up and down by means (not shown), well known in the art, on guideways 21, which are rigidly connected to the spindle rail 17. The ring 22 which is carried by the ring rail 20 and which surrounds the bobbin 2, is also of conventional design and construction.

Below the spindle rail 17, the casing 4 is flexibly retained on an auxiliary rail 24 which is rigidly connected to the spindle rail 17 by a bracket 25. For this purpose, the lower end of the casing 4 is engaged into a metal tube 23 which has a flexible upper portion 23a, the flexibility of which is produced by slots 26 in the wall of the tube, the slots being arranged in several transverse planes parallel to each other and offset in the peripheral direction, so that each of the slots 26 is separated by narrow flexible webs from the slots at the levels above and below it. This enables the lower end of the casing 4 to effect angular and also, to some extent, lateral displacements relative to the auxiliary rail 24.

Below these slots the metal tube 23 projects through a circular aperture 27 in the auxiliary rail 24 and is provided with a thread, on which respectively above and below the auxiliary rail 24 a nut 28 and a nut 29 is screwed; by these screws the tube 23 and with it the lower end of the casing 4 is adjustably retained against transverse displacement with respect to the longitudinal axis 19 of the latter. A lock nut 30 ensures that the nut 29 is not loosened unintentionally through vibrations occurring during operation.

The connection of the metal tube 23 to the auxiliary rail 24 by the two nuts 28 and 29 also makes its possible to retain the lower part of this metal tube at a somewhat higher or lower level in the auxiliary rail 24, within certain narrow limits, and in this way to exert on the flexible part 23a of the metal tube 23 (that is, the part having the slots 26), and also via the casing 4, on the rubber plates 6 and 10 an axial upward or downward force. Such an axial force has an effect on the elastic action of the flexible elements 6, 10 and 23a, and the axial adjustability of the metal tube 23 therefore makes it possible to vary the oscillation frequency of the spindle bearing.

Above its point of connection with the metal tube 23 the spindle casing 4 carries a heavy additional weight 31, which is fastened to the casing 4 by means of a pin 32.

As already mentioned previously, the axis of rotation of the rotor assembly comprising the spindle shaft, the bobbin 2 with the yarn wound thereon, and the pulley 1, assumes a fixed position at high revolutions. As this axis of rotation coincides with the centroidal axis of the rotor but not, as a rule, with the geometrical axis of the spindle shaft, the longitudinal axis 19 of the casing 4 cannot stay aligned with the axis of rotation but must effect a gyratory motion about it. This is rendered possible in that the casing 4 is retained for oscillation and transverse displacement both at the level of the spindle rail 17 by the rubber plates 6 and 10 centered in the aperture 8 of the supporting plate 9, and below this by the flexible metal tube 23.

The movement of the casing 4 is also affected by the additional weight 31, whose inertia produces inertia forces opposing the transverse motion of the lower end of the casing 4 and thus causes the point of intersection of the longitudinal axis 19 of the spindle bearing casing 4 with the steadied axis of rotation of the spindle rotor to be at a lower level than it would without the additional weight. This has the result that the distance between the said point of intersection and the zone of the collar bearing or of the bearing sleeve connection, in which the casing 4 must follow the motions of the spindle shaft or bearing sleeve, is greater and the amplitude of the oscillation or gyration of the casing 4 is smaller. Moreover, this results in a diminution of the forces acting on the flexible tube 23 and a better distribution of the forces produced by the vibration of the rotor, on this tube and on the rubber plates 6 and 10.

Thus, steady and silent running of the spindle rotor and in particular of the bobbin 2 about a stationary axis passing through the centre of gravity of the rotor is ensured at high rotation speeds.

This axis can, however, still deviate, in position and direction, from the centre axis of the spinning ring 22, i.e. from that axis which follows the centre point of this ring 22 in the upward and downward motion of the ring rail 20. These axes must coincide in order that the yarn is subjected to a constant tension during spinning.

The adjustability, transversely to the longitudinal axis 19 of the spindle casing 4, of both the supporting plate 9 and of the lower part of the metal tube 23, acting as a lower retaining member for the spindle bearing casing 4, permits the axis of rotation of the rotor to be brought into accurate coincidence, both as to position and as to direction, with the centre axis of the spinning ring 22.

The embodiment shown in FIG. 2 differs from that shown in FIG. 1 in that the spindle bearing casing 4 is supported by means of its flange 5 axially on a rubber ring 40 of square cross-section, which in turn rests on the supporting plate 9.

The rubber ring 40 can, as shown, be centered on the flange 5 and on the supporting plate 9, or it can be vulcanized to these components. It forms a swingable and transversely movable connection between the casing 4 and the supporting plate 9. The latter is connected to the spindle rail 17 by screw 15 (not shown) in the same way as in the embodiment shown in FIG. 1, so as to be adjustable transversely to the casing axis 19.

Lower down, the spindle bearing casing 4 is provided with a thread onto which the additional weight 41 is screwed so that its position is adjustable in the direction of the casing axis, and the weight is secured by means of a lock nut 42.

Below the casing 4, a rod 46, provided with a plate-shaped head 45, engages in an inner shoulder 43 of the additional weight 41 via a rubber insert 44; like the flexible tube 23 in the embodiment described with reference to FIG. 1, this rod is secured to the auxiliary rail 24 by means of two nuts 28 and 29 so that its position is adjustable in the transverse direction with respect to the casing axis 19. By means of these nuts, the rod 46 can be so adjusted that it keeps the rubber insert 44 compressed to the desired extent and in this way exerts a downwardly directed axial force on the spindle bearing casing 4.

The casing 4 and the additional weight 41 are connected to the rod 46 and the auxiliary rail 24 by the rubber insert 44 so as to be able to oscillate and to some extent also move transversely, so that the rod 46 and the rubber insert 44 perform the same function as the flexible tube 23 in the embodiment described with reference to FIG. 1.

The mode of operation of the embodiment shown in FIG. 2 is basicaly the same as that in the embodiment of FIG. 1 and needs no further explanation.

In both embodiments, the adjustability of the supporting plate 9 and the flexible tube 23 or the rod 46 transversely with respect to the casing axis 19, also makes it possible to compensate for the effect of the one-sided pull of the driving belt 3 on the running of the spindle.

I claim:

1. A textile mill spindle bearing assembly comprising in combination:
   (a) a frame member;
   (b) a casing having a substantially rigid portion;
   (c) bearing means including a pair of bearings mounted in said casing, at least one of said bearings being movably connected to said casing to permit lateral displacement thereof, whereby the axis passing through the centers of said bearings is able to effect pendular and/or gyratory displacements relative to said substantially rigid portion of said casing;
   (d) a spindle rotatably supported by said bearing means;
   (e) a holding member secured in laterally adjustable position on said frame member;
   (f) yielding means connecting said holding member to a first zone of said rigid portion of said casing for transverse parallel and swinging displacement thereof relative to said holding member; and
   (g) further holding means engaging said casing in a second zone of its said rigid portion spaced from said first zone for exerting on the casing, in said second zone, forces which tend to counteract transverse displacement thereof.

2. A textile mill spindle bearing assembly as claimed in claim 1 comprising an auxiliary support member rigidly connected to said frame member, said casing being oscillably connected at its said second zone to said auxiliary support member.

3. A textile mill spindle as claimed in claim 2 comprising a second holding member forming part of said further holding means and secured in laterally adjustably position to said auxiliary support member, said casing being oscillably connected at its said second zone to said second holding member.

4. A textile mill spindle as claimed in claim 2 and comprising second yielding means interposed between said casing and said auxiliary support member.

5. A textile mill spindle as claimed in claim 4 wherein said second yielding means is yielding in a direction transverse to the axis of said casing.

6. A textile mill spindle as claimed in claim 1 comprising an auxiliary support member rigidly connected to said frame member, a second holding member secured to said auxiliary support member, said casing being oscillably connected at its said second zone to said second holding member, the position of at least one of said holding member secured on said frame member and of said second holding member secured to said auxiliary support member being axially adjustable.

7. A textile mill spindle assembly as claimed in claim 1 in which said further holding means comprise a stabilizing weight carried by said casing in said second zone of its said rigid portion.

References Cited

UNITED STATES PATENTS 3,049,860   8/1962   Beerli _____ 57—135

MARTIN P. SCHWADRON, Primary Examiner

F. SUSKO, Assistant Examiner